United States Patent
Devaraj et al.

(10) Patent No.: US 12,451,490 B2
(45) Date of Patent: Oct. 21, 2025

(54) METHODS FOR PRODUCING BINDER-COATED CONDUCTOR-SPECKLED ACTIVE BATTERY MATERIAL AGGLOMERATIONS FOR ELECTRODES

(71) Applicants: Vikram Devaraj, Austin, TX (US); Varun Devaraj, Chennai (IN)

(72) Inventors: Vikram Devaraj, Austin, TX (US); Varun Devaraj, Chennai (IN)

(73) Assignee: PIXION BATTERIES, INC., Austin, TX (US)

( * ) Notice: Subject to any disclaimer, the term of this patent is extended or adjusted under 35 U.S.C. 154(b) by 0 days.

(21) Appl. No.: 18/655,406

(22) Filed: May 6, 2024

(65) Prior Publication Data

US 2024/0429392 A1 Dec. 26, 2024

Related U.S. Application Data

(63) Continuation-in-part of application No. 18/213,873, filed on Jun. 25, 2023, now Pat. No. 11,978,908.

(51) Int. Cl.
*H01M 4/00* (2006.01)
*H01M 4/505* (2010.01)
*H01M 4/525* (2010.01)
*H01M 4/62* (2006.01)

(52) U.S. Cl.
CPC .......... *H01M 4/623* (2013.01); *H01M 4/505* (2013.01); *H01M 4/525* (2013.01)

(58) Field of Classification Search
CPC ....................................................... H01M 4/00
See application file for complete search history.

(56) References Cited

U.S. PATENT DOCUMENTS

2013/0224583 A1 * 8/2013 Green ................... H01M 4/364
429/211

* cited by examiner

*Primary Examiner* — Gordon Baldwin
*Assistant Examiner* — Mohammad Mayy

(57) ABSTRACT

A method for producing binder-coated active battery material agglomerations includes agitating, within a vessel, a volume of a binder-solvent solution across two or more steps with a particulate mixture including active battery material particles. The binder-solvent solution has a solubility limit for a mixture of binder material particles within a first solvent solution at a first set of environmental parameters. While retaining the particulate mixture within the vessel, the particulate mixture is subjected to a second set of environmental parameters across two or more steps which reduces the solubility limit to generate a powder mixture of binder-coated active battery material agglomerations.

16 Claims, 1 Drawing Sheet

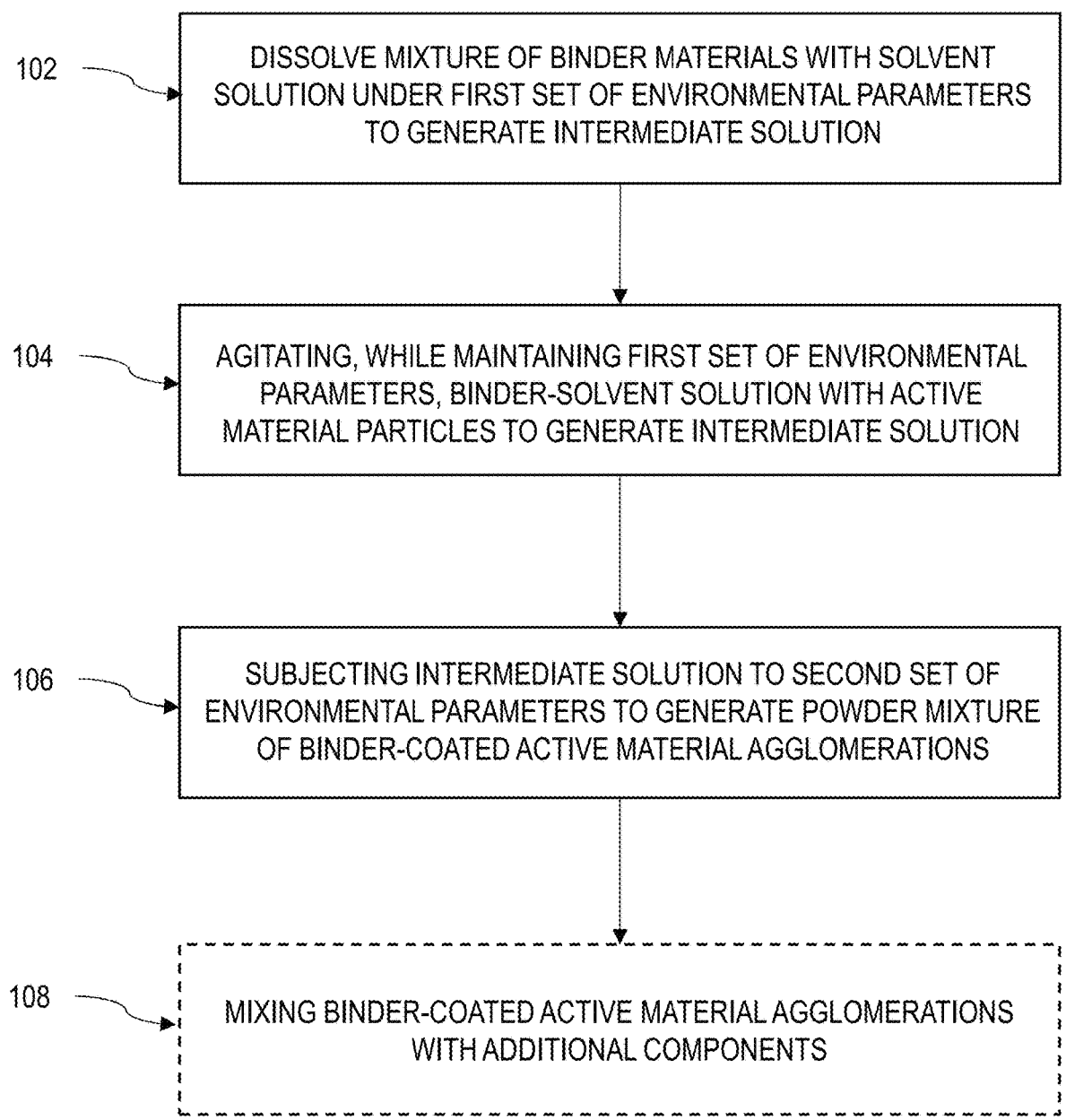

METHODS FOR PRODUCING BINDER-COATED CONDUCTOR-SPECKLED ACTIVE BATTERY MATERIAL AGGLOMERATIONS FOR ELECTRODES

CROSS-REFERENCE TO RELATED APPLICATIONS

The present application claims priority as a continuation-in-part of U.S. patent application Ser. No. 18/213,873, entitled "METHODS FOR PRODUCING BINDER-COATED CONDUCTOR-SPECKLED ACTIVE BATTERY MATERIAL AGGLOMERATIONS FOR ELECTRODES" and filed on Jun. 25, 2023, the entirety of which is incorporated by reference herein.

BACKGROUND

Innovation of portable electronic devices has drawn attention towards efficient energy storage as transportable systems and portable devices such as smartphones, laptops, and smart health devices, have reduced in size while their energy needs have increased. Electrochemical storage and conversion devices are expanding the capabilities of these systems in a variety of fields including portable electronic devices, air and space craft technologies, passenger and cargo vehicles, and biomedical instrumentation. Electrochemical storage and conversion devices have design and performance attributes specifically engineered to provide compatibility with a diverse range of application requirements and operating environments.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 1 is a diagram of a method of producing binder-coated conductor-speckled active battery material particulate subunits in accordance with some embodiments.

DETAILED DESCRIPTION

Significant pressures exist to expand the functionality of energy storage and conversion devices, such as batteries, fuel cells, and electrochemical capacitors, in an ever-widening range of applications. Continued development has created a need for mechanically robust, high reliability, and high energy density electrochemical storage and conversion devices capable of good performance in a useful range of operating environments. Many recent advances in electrochemical storage technology are attributable to fabrication and integration of new materials for device components. Battery technology, for example, continues to rapidly develop, at least in part, due to the development of electrode and electrolyte materials for these systems.

Conventional electrode fabrication often involves a solvent-based approach that includes the mixing of several key components to form a slurry. These components include active battery materials, conductive agents, polymeric binders, and solvents. Active battery materials are the substances in a battery that are involved in the electrochemical reactions that generate electric current. In a lithium-ion battery, for example, the active battery material in the cathode is often a lithium metal oxide, while the active battery material in the anode is typically graphite. Conductive agents, also known as conductive additives, are materials added to the electrodes to improve their electrical conductivity. Common conductive agents include carbon black, graphite, carbon nanotubes, and graphene. Polymeric binders are used to hold the active battery material particles together and adhere them to the current collector. They provide mechanical strength and flexibility to the electrode. Common polymeric binders include polyvinylidene fluoride (PVDF) and carboxymethyl cellulose (CMC). Solvents are used to dissolve the polymeric binder and create a slurry that can be easily applied to the current collector. After the slurry is applied, the solvent is evaporated, leaving behind a solid electrode. Common solvents include N-Methyl-2-pyrrolidone (NMP) and water. During the mixing process, the polymeric binder, pre-dissolved in the solvent, flows around and partially coats the active battery material and conductive agent particles. The resulting slurry is cast onto a metallic current collector and dried to evaporate the solvent, thus forming a porous electrode. Evaporating the solvent creates a dry porous electrode; however, substantial heating and drying times are involved in evaporating the solvent and curing/binding the active battery materials onto the metallic current collector.

Electrode manufacturing techniques conventionally include solvent recovery systems during the drying process to recover evaporated solvent due to the high cost and potential pollution of traditional solvents. Less expensive and environmentally friendly solvents, such as aqueous based slurries, could eliminate the costs associated with the recovery system but the electrode would still require a time- and energy-demanding drying step. Further, the use of water as a cathode or anode solvent provides considerable benefit, but it also presents significant challenges. In particular, the use of water is constrained by its reactivity with electroactive battery materials (e.g., lithium metal).

To address the challenges associated with traditional electrode manufacturing processes, the techniques described in FIG. 1 significantly reduce the amount of solvent required for binder distribution and coating of active battery material particles. In certain embodiments, the proposed method of producing binder-coated active battery material agglomerations involves the following steps: Firstly, a mixture of binder material particles is dissolved within a solvent solution under a specific set of environmental parameters. These parameters include applied heat, pressure, and time that exceed standard ambient conditions, resulting in a binder-solvent solution. Secondly, this binder-solvent solution is agitated in conjunction with a particulate mixture comprising active battery material particles, while maintaining the aforementioned environmental parameters. Finally, this intermediate solution is subjected to a second set of environmental parameters, distinct from the first, to generate a powder mixture. This second set of parameters also includes specific temperature, pressure, and time conditions. The resulting powder mixture comprises binder-coated active battery material agglomerations, each of which includes one or more active battery material particles that are at least partially coated with binder material. Using this binder-coated active battery material in dry electrode manufacturing provides a more efficient and environmentally friendly approach, reducing the need for solvent recovery systems and the associated costs and potential pollution.

FIG. 1 is a block diagram of a method 100 of producing binder-coated conductor-speckled active battery material particulate subunits in accordance with some embodiments. For the purposes of this disclosure, the term "conductor-speckled active battery material particulate" refers to a composite particle that includes an active battery material particle that is speckled, or interspersed, with conductive particles. These conductive particles enhance the electrical conductivity of the active battery material particle, facilitating the flow of electric current during battery operation. In the context of this application, the term 'active battery material' is used to refer to the material in a battery cell that participates in electrochemical reactions and contributes to the battery's energy storage capacity. Examples of active battery materials include, but are not limited to, Lithium Iron Phosphate (LFP), Lithium Nickel Manganese Cobalt Oxide (NMC), Lithium Cobalt Oxide (LCO), Lithium Manganese Oxide (LMO), Lithium Titanate (LTO), Lithium Nickel Cobalt Aluminum Oxide (NCA), synthetic graphite particulate, natural graphite particulate, Si nanocomposites, Silicon graphite composite, Silicon porous carbon composite, $LiTiO_2$, $Li_4Ti_5O_{12}$, Sn particulate, and SiOx/Si particulate. It should be understood that this list is not exhaustive and may include other active battery materials known in the art or developed in the future. For the purposes of this disclosure the terms: particle, particulate, particulate subunit, primary particle, micro sphere, aggregate and agglomeration are used consistent with the definitions provided in a National Institute of Standards and Technology (NIST) publication titled, The Use of Nomenclature in Dispersion Science and Technology, previously issued as NIST Special Publications 945 and 946, August 2001 which provides guidelines for the use of technical and scientific nomenclature relevant to ceramic dispersion, the entire disclosure of which is hereby incorporated by reference herein.

The method 100 begins at block 102 with dissolving a mixture of binder material particles within a solvent solution under the application of a first set of environmental parameters including at least one of applied heat or pressure above ambient conditions to create a binder-solvent solution. The solubility limit of this solution, which denotes the maximum capacity of binder material particles that can be dissolved within the solvent under the environmental conditions of the first set of environmental parameters, is higher compared to standard conditions. In this context, the binder material particles include, in various embodiments, materials that have shown promise in this application. These materials include polyvinylidene fluoride (PVDF), poly(vinylidene fluoride-co-hexafluoropropylene) (PVDF-HFP), polytetrafluoroethylene (PTFE), polyimides, Ethylene-Propylene-Diene Monomer (EPDM), poly(acrylic acid-co-maleic acid) (PAA-MA), poly(acrylic acid-co-itaconic acid) (PAA-IA), partially or fully fluorinated polymers and copolymers, poly(acrylic acid) (PAA), lithiated poly(acrylic acid) (lithiated-PAA), carboxymethyl cellulose (CMC), Sodium caboxymethyl cellulose (NaCMC), and, styrene butadiene rubber (SBR). When multiple binders are used, the melting point and softening point of each binder in the binder system may be the same or different. In some embodiments, the mixture of binder material particles includes a binder solution that is a commercially available dispersion or emulsion that contains binder particulates dispersed in a solution.

The solvent solution includes, in various embodiments, a solution of one or more solvents such as dimethylformamide (DMF), dimethyl sulfoxide (DMSO), N-methylpyrrolidone (NMP) or dimethylacetamide (DMAc), triethyl phosphate (TEP), dihydrolegoflucosenone (cyrene), acetyl tributyl citrate (ATBC), acetone, tetrahydrofuran (THF), difluoromethane ($CH_2F_2$), ethanol, methanol, water, carbon-di-oxide and the like.

As will be appreciated by those skilled in the art, it is often difficult to fully dissolve binder material particles within many solvents under normal room ambient conditions (e.g., standard [or normal] temperature and pressure as commonly defined by NIST with a temperature in the range of 20-25 degrees Celsius and an absolute pressure of 1 bar) without the addition of additional agitation or increasing the temperature and/or pressure at which the binder material particles and solvent solution are mixed together.

Accordingly, block 102 includes dissolving a mixture of binder material particles within a solvent solution under the application of a first set of environmental parameters which increases the solubility limit (relative to standard temperature and pressure), allowing an increase in the maximum amount of binder material particles soluble within the solvent solution. These parameters include applied heat, pressure, and time that exceed standard ambient conditions, and included at least one of applied heat or pressure above ambient conditions to generate a binder-solvent solution. In one embodiment, the first set of environmental parameters includes an increased temperature above standard room temperature. As used herein, the term "solubility limit" refers to a total amount of solute (e.g., binder material) that can be dissolved in a volume of solution such that the solution is fully saturated and the solution will not dissolve any additional solute. For example, in one embodiment, only an amount X of binder material particles can be dissolved within 1.0 liters of solvent solution at standard temperature and pressure. With an increase in temperature and/or pressure, a larger quantity of binder material particles, denoted as Y (where Y>X), can be dissolved in the same volume of solvent solution.

In one embodiment, a mixture of PVDF is completely dissolved in a solvent solution of NMP at a range of 30-40 degrees Celsius at room atmospheric pressure. In another embodiment, the first set of environmental parameters includes standard room temperatures while increasing a pressure in a vessel within which the binder material particles are mixed with the solvent solution. In yet another embodiment, the first set of environmental parameters includes both an increased temperature above standard room temperature and an increased pressure in a vessel within which the binder material particles are mixed with the solvent solution. For example, in various embodiments, ethanol is included in the solvent solution of block 102. However, those skilled in the art will recognize that ethanol does not dissolve many binder material particles (e.g., PVDF) at normal room ambient conditions. To counteract this issue, in various embodiments, the operations of block 102 dissolves PVDF in ethanol by increasing the vessel (e.g., a closed container) temperature and pressure to approximately 200 degrees Celsius at 100 bar. This process allows for the successful dissolution of the binder material particles in the solvent, creating a binder-solvent solution that is suitable for the next steps in the process. Other liquid solvents can similarly be utilized, including but not limited to methanol and acetone, under specific temperature and pressure conditions that allow for the dissolution of the binder material particles.

In other embodiments, a gaseous solvent such as carbon dioxide may also be employed as a supercritical solvent for dissolving binder material particles. Under standard conditions, carbon dioxide exists as a gas. However, when both temperature and pressure are elevated beyond its critical point (critical temperature: 31.1° C., critical pressure: 73.8 atmospheres), carbon dioxide transitions into a supercritical fluid state. This state exhibits unique properties, behaving like a gas in terms of filling its container while maintaining a liquid-like density. This supercritical carbon dioxide (sCO2) can effectively dissolve certain binder material particles. For instance, PVDF can be dissolved in sCO2 at conditions of approximately 170° C. and 1650 bar. In other embodiments, the solvent solution includes subcritical solvents at subcritical conditions for that solvent.

In some embodiments, the operations of block 102 include the addition of a co-solvent to the solvent solution, which can effectively reduce the temperature and pressure requirements for dissolving binder material particles. For instance, when a co-solvent of 38% ethanol is added to a solvent solution of pure supercritical CO2 (sCO2), the conditions required for dissolving PVDF are reduced from approximately 170° C. and 1650 bar to approximately 170° C. and 600 bar. It should be noted that other co-solvents can also be utilized in this context, such as acetone, dimethoxyethane (DME), and water, among others. While the use of co-solvents is described here in relation to sCO2, the principle of reducing temperature and/or pressure requirements through the use of co-solvents can also be applied to other primary solvents, such as N-Methyl-2-pyrrolidone (NMP).

In various embodiments, the binder-solvent solution includes 10-30% by weight of dissolved binder material particles. In some embodiments, the binder material particles comprise the binder-solvent solution at greater than or equal to about 1% by weight of the binder-solvent solution, greater than or equal to about 5% by weight of the binder-solvent solution, optionally greater than or equal to about 10% by weight of the binder-solvent solution, optionally greater than or equal to about 20% by weight of the binder-solvent solution, optionally greater than or equal to about 30% by weight of the binder-solvent solution, and in certain variations, optionally greater than or equal to about 40% by weight of the binder-solvent solution. As will be recognized by those skilled in the art, the viscosity of the binder-solvent solution increases as the percentage by weight of binder material particles increases. Accordingly, there is a certain threshold beyond which it becomes undesirable to further increase the binder material content of the binder-solvent solution as it will become too viscous for further processing. However, this binder-solvent solution still utilizes significantly less solvent per unit binder material relative to conventional solvent slurries.

Referring now to block 104, the method 100 continues by agitating the binder-solvent solution with a particulate mixture that includes active battery material particles, while maintaining the first set of environmental parameters. This agitation process, which can be achieved through methods such as stirring, shaking, or ultrasonic vibration, helps to ensure a uniform distribution of the active battery material particles in the binder-solvent solution, leading to the generation of an intermediate solution. The active battery material particles can include one or more cathode materials, such as $LiCoO_2$, $LiNiO_2$, $LiMnO_2$, $LiMn_2O_4$, $LiNi_xMn_{2-x}O_4$, $LiFePO_4$, $LiMnPO_4$, $LiCoPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, and $Li_{1+x}Ni_yMn_{1-x}Co_zO_2$. In some cases, these active battery material particles may be carbon coated or otherwise treated to enhance their performance. Alternatively, the active battery material particles can include one or more anode materials, such as synthetic graphite particulate, natural graphite particulate, Si nanocomposites, $LiTiO_2$, $Li_4Ti_5O_{12}$, Sn particulate, and $SiO_x$/Si particulate.

In some embodiments, the operations of block 104 include mechanically agitating the active battery material particles within the binder-solvent solution by subjecting the binder-solvent solution to a high shear mixing, sonification, or any other suitable method of uniformly distributing the active battery material particles in the binder-solvent solution to generate the intermediate solution. In some embodiments, the active battery material particles comprise the intermediate solution at greater than or equal to about 10% by weight of the intermediate solution, optionally greater than or equal to about 20% by weight of the intermediate solution, optionally greater than or equal to about 30% by weight of the intermediate solution, optionally greater than or equal to about 40% by weight of the intermediate solution, optionally greater than or equal to about 50% by weight of the intermediate solution, optionally greater than or equal to about 60% by weight of the intermediate solution, optionally greater than or equal to about 70% by weight of the intermediate solution, optionally greater than or equal to about 80% by weight of the intermediate solution, and in certain variations, optionally greater than or equal to about 90% by weight of the intermediate solution.

In some embodiments, the active battery material particles include conductor-speckled active battery material composite particles or particulate subunits. These are generated by agitating a particulate mixture that includes both active battery material particles and conductive particles, resulting in a mixture of conductor-speckled active battery material particulate subunits. These subunits consist of one or more conductor-speckled active battery material particles, which are held together by electrostatic forces. Each of these particles includes a plurality of conductive particles that are in electrical contact with an active battery material particle, thereby enhancing the electrical conductivity of the overall structure. The operations of block 104 include mechanically agitating the mixture, using methods such as high shear mixing, to uniformly distribute the conductive particles among the active battery material particles. The conductive particles can include carbon additives such as C65 carbon black, C45 carbon black, super P carbon black, acetylene black, ketjenblack carbon black, carbon nanotubes, graphene, carbon nanofibers, carbon fibers, and others. In various embodiments, each of the conductor-speckled active battery material particles includes a plurality of conductive particles in electrical contact with an active battery material particle.

In one embodiment, the operations of block 104 includes agitating a dry powder mixture of conductive particles and active battery material particles to generate a powder mixture of conductor-speckled active battery material particulate subunits. In another embodiment, the operations of block 104 includes agitating a dry powder mixture of active battery material particles within a conductive particle solution, where the solution is a dispersion of conductive particles in a liquid medium. For example, in some embodiments, block 104 includes agitating the conductive particles within a solution by subjecting the solution to a high shear mixing, sonification, or any other suitable method of breaking down conductive particle agglomerations into constituent particles, or at least smaller agglomerations, and/or uniformly distributing the conductive particles in the solution. In other embodiments, a conductive particle solution is prepared by introducing a wetting agent to a dry powder mixture of conductive particles. After wetting the dry powder mixture of conductive particles, block 104 continues with agitating the wetted conductive particles within a volume of solution (e.g., water, ethanol) by subjecting the conductive particle solution to a high shear mixing, sonification, or any other suitable method of uniformly distributing the conductive particles in the solution.

Subsequently, the dry powder mixture of active battery material particles is introduced to the conductive particle solution. In other embodiments, the operations of block 104 includes agitating an active battery material solution, where the solution is a dispersion of active battery material particles in a liquid medium, and a conductive particle solution together to generate a mixture of conductor-speckled active battery material particulate subunits. Afterwards, the method 100 continues by agitating the active battery material particles and conductive particles within a binder solution. In one embodiment, the binder solution is a commercially available dispersion, or emulsion, that contains binder particulates dispersed in a solution. In another embodiment, the binder solution is prepared by introducing a wetting agent to a dry powder mixture of binder particulates. After wetting the dry powder mixture of binder particulates, block 104 continues with agitating the wetted binder particulates within a volume of solution (e.g., water, ethanol) by subjecting the binder solution to a high shear mixing, sonification, or any other suitable method of uniformly distributing the binder particulates in the solution.

The method of creating the intermediate solution can be achieved through several specific embodiments, each resulting in a solution that includes binder material particles, active battery material particles, and conductive particles uniformly distributed. The first embodiment involves mixing a mixture of conductor-speckled active battery material particles with the binder-solvent solution. The second embodiment involves a two-step process where a dry mixture of active battery material particles is first agitated within the binder-solvent solution, followed by the addition of a dry mixture of conductive particles. This sequence prioritizes the dispersion of active battery material particles in the binder-solvent solution before the conductive particles are introduced. The third embodiment also involves a two-step process, but in this case, a dry mixture of conductive particles is agitated within the binder-solvent solution before adding a dry mixture of active battery material particles. This sequence prioritizes the dispersion of conductive particles in the binder-solvent solution before the active battery material particles are introduced. A fourth embodiment includes mixing the binder materials, active battery materials, and conductive particles together with the solvent solution prior to the application of the first set of environmental parameters. These specific embodiments provide flexibility in the manufacturing process, allowing for adjustments based on the specific properties of the materials used and the desired characteristics of the final product.

In another embodiment, the method involves agitating a dry mixture of active battery material particles within the binder-solvent solution before introducing a solution of conductive particles. This sequence ensures that the active battery material particles are well-dispersed in the binder-solvent solution before the conductive particles are added. Alternatively, in some embodiments, a solution of conductive particles is agitated within the binder-solvent solution prior to the addition of a dry mixture of active battery material particles. This sequence prioritizes the dispersion of conductive particles in the binder-solvent solution before the active battery material particles are introduced. In certain scenarios, the process may involve active battery material particles coming into contact with water. It is important to note that some active battery materials, such as coated LFP (for instance, carbon-coated LFP) and lower nickel NMCs (for instance, NMC111 as opposed to the more sensitive NMC811 and NMC9055), exhibit greater resistance to potential detrimental effects when exposed to water.

The method proceeds to step 106, where the intermediate solution is subjected to a second set of environmental parameters, specifically temperature, pressure, and time, that reduces the solubility limit of the given binder in the intermediate solution to generate a powder mixture of binder-coated active battery material agglomerations. This second set of environmental parameters could involve a decrease in pressure while maintaining a constant temperature (a process known as isothermal expansion), a decrease in temperature while keeping the pressure constant (referred to as isobaric cooling), or a controlled reduction of both pressure and temperature. For instance, in one specific embodiment, the second set of environmental parameters involves an increase in temperature compared to the first set of environmental parameters, which facilitates the evaporation of solvent content from the intermediate solution. In this specific scenario, raising the temperature to 180 degrees Celsius at room atmospheric pressure is sufficient to evaporate nearly all quantities of NMP within the intermediate solution.

As previously discussed, in one embodiment, only a maximum amount X of binder material particles dissolves within 1.0 liter of solvent solution at standard temperature and pressure. An amount Y>X of binder material particles dissolve within that same 1.0 liters of solvent solution with increasing temperature and/or pressure. Conversely, decreasing temperature and/or pressure will decrease the solubility limit of a given binder in the solution. Additionally, it will be appreciated that changing the total volume of solution will not change the solubility limit, but will change the absolute quantity of binder that can be dissolved. For example, due to the same solubility limit of the binder per unit volume of solvent for a given set of environmental parameters (e.g., standard room and pressure), halving the solvent amount from 1.0 liters to 0.5 liters will cut the maximum quantity of binder soluble in the solution from X to X/2.

The method continues with another specific embodiment where the second set of environmental parameters involves a decrease in pressure within the vessel containing the intermediate solution. In this scenario, the solvent's evaporation from the intermediate solution is facilitated when the vessel is sealed and the pressure is reduced, for instance, under vacuum conditions. This reduction in pressure allows the liquid solvent to vaporize and evaporate at temperatures lower than those at atmospheric pressure. In yet another specific embodiment, the second set of environmental parameters involves both a change in temperature, such as an increase above standard room temperature, and a decrease in pressure, potentially below atmospheric pressure, within the vessel containing the intermediate solution. This combination of parameters facilitates solvent evaporation at lower temperatures due to the reduced pressure.

In certain specific embodiments, the process includes mechanically agitating the intermediate solution to ensure a uniform distribution of binder particulates and active battery material particles during the evaporation phase. As evaporation reduces the solvent's liquid content, the viscosity of the remaining intermediate solution increases. As the liquid content decreases, it becomes crucial to maintain or even increase the level of mechanical agitation within the intermediate solution. This continuous movement of particles prevents preferential settling, which could occur due to the different densities of the constituent particles.

In various embodiments, after all remaining solvent is evaporated, the intermediate solution is dried into a powder mixture of binder-coated active battery material agglomerations. Each of the binder-coated active battery material agglomerations includes one or more active battery material particles having at least a partial coating of binder material. Such agglomerations may, in various embodiments, be mechanically processed (e.g., ground, crushed, and the like) to produce a finer powder mixture.

In a specific embodiment, the method 100 continues at block 108 with the optional step of mixing binder-coated active battery material agglomerations with additional components. This step may be necessary when the operations of block 106 do not mix conductor-speckled active battery material particles with the binder-solvent solution. The mixing process at block 108 involves agitating a particulate mixture that includes binder-coated active battery material agglomerations and conductive particles, thereby generating a mixture of binder-coated conductor-speckled active battery material particulate subunits. This process employs mechanical agitation, high shear mixing, or any other suitable method to uniformly distribute the conductive particles amongst the active battery material particles. In various embodiments, each of the conductor-speckled active battery material particles includes a plurality of conductive particles in electrical contact with an active battery material particle.

In the art, it is well understood that binder particles have a tendency to clump together. The application of pure mechanical forces often proves insufficient to break these clumps into their constituent particles, especially before the binder material heats up to a temperature (for instance, approximately 170 degrees Celsius for PVDF) at which it becomes pliable and even more challenging to separate into smaller particle sizes. However, in the process outlined in block 108, a powder is generated where one or more conductive particles are situated between binder-coated active material particles. The presence of these conductive particle additives reduces the interparticle forces between binder particles by introducing spacing, thereby decreasing the degree of agglomeration and resulting in a powder mixture composed of binder-coated conductor-speckled active battery material agglomerations. In certain embodiments, the process of block 108 includes the cooling of the particulate mixture during mechanical agitation. This step is crucial to prevent the binder materials from heating to a temperature at which they become pliable and start to agglomerate.

In some embodiments, the active battery material primary particles comprise the powder mixture of conductor-speckled active battery material particulate subunits at greater than or equal to about 10% by weight of the powder mixture aggregate, optionally greater than or equal to about 20% by weight of the powder mixture aggregate, optionally greater than or equal to about 30% by weight of the powder mixture aggregate, optionally greater than or equal to about 40% by weight of the powder mixture aggregate, optionally greater than or equal to about 50% by weight of the powder mixture aggregate, optionally greater than or equal to about 60% by weight of the powder mixture aggregate, optionally greater than or equal to about 70% by weight of the powder mixture aggregate, optionally greater than or equal to about 80% by weight of the powder mixture aggregate, optionally greater than or equal to about 90% by weight of the powder mixture aggregate, optionally greater than or equal to about 95% by weight of the powder mixture aggregate, and in certain variations, optionally greater than or equal to about 96% by weight of the powder mixture aggregate. This flexibility in the composition allows for the optimization of the powder mixture aggregate for various applications.

In various embodiments, the method also includes an optional step of adding an additional amount of conductive particles to the mixture of conductor-speckled active battery material aggregates. This additional step, which can be performed at any stage in the method, serves to enhance the composition by weight and overall conductivity of the mixture. Moreover, this addition of conductive particles can be carried out multiple times at different stages of the method, providing flexibility in optimizing the conductivity of the mixture.

Although FIG. 1 is described above in the context of a single-step evaporation for ease of illustration and description, those skilled in the art will recognize that the method of FIG. 1 may include any number of mixture and evaporation steps without departing from the scope of this disclosure. Conductor-speckled active battery material agglomerations may be produced via multi-step evaporation with differing volumes of solvent solution spread amongst any number of mixture and evaporation steps in accordance with some embodiments without departing from the scope of this disclosure.

For example, in various embodiments, the operations of block 104 include agitating, within a vessel, a first volume that is less than a total volume of a binder-solvent solution with a particulate mixture including active battery material particles to generate a first intermediate mixture. The agitation may include spraying, misting, fogging, atomizing, or pumping the first volume of the binder-solvent solution into the vessel and over the particulate mixture. For example, in some embodiments, the spraying, misting, fogging, atomizing, or pumping of the binder-solvent solution occurs while the particulate mixture is being agitated, such as by rotation or mixing, or otherwise being moved around within the vessel. That first intermediate mixture is subjected, while retaining the first intermediate mixture within the vessel, to a second set of environmental parameters (e.g., temperature, pressure, or time) which reduces the solubility limit of the given binder within the first intermediate mixture to generate a second intermediate mixture. This second set of environmental parameters could involve a decrease in pressure while maintaining a constant temperature (a process known as isothermal expansion), a decrease in temperature while keeping the pressure constant (referred to as isobaric cooling), or a controlled reduction or increase of both pressure and temperature, either individually or concurrently. For instance, in one specific embodiment, the second set of environmental parameters involves an increase in temperature compared to the first set of environmental parameters, which facilitates the evaporation of solvent content from the first intermediate solution. In this specific scenario, raising the temperature to approximately 180 degrees Celsius at room atmospheric pressure is sufficient to evaporate nearly all quantities of NMP within the first intermediate solution.

After evaporating solvent away from the first intermediate solution, the resulting mixture (i.e., the second intermediate mixture) include binder particulates interspersed between one or more active material particles; the binder particulates are present within the resulting mixture of binder-coated active battery material agglomerations at a first percentage by weight of the resulting mixture. Subsequently, the resulting mixture (i.e., the second intermediate mixture) is introduced to a second volume that is at least a portion of the total volume of binder-solvent solution remaining by agitating, while retaining the second intermediate mixture within the vessel, the second volume of the binder-solvent solution with the second intermediate mixture to generate a third intermediate mixture.

That third intermediate mixture is subjected, while retaining the third intermediate mixture within the vessel, to a second set of environmental parameters (e.g., temperature, pressure, or time) which reduces the solubility limit of the given binder within the third intermediate mixture to generate a powder mixture of binder-coated active battery material agglomerations. After evaporating solvent away from the third intermediate solution, the resulting mixture (i.e., the powder mixture) includes binder-coated active battery material agglomerations including one or more active battery material particles having at least a partial coating of binder material; the binder particulates are present within the resulting mixture of binder-coated active battery material agglomerations at a second percentage by weight of the resulting mixture. As will be appreciated by those skilled in the art, the second percentage is higher than the first percentage by weight of binder particulates.

For example, in one embodiment, the multi-step evaporation is a two-step evaporation that includes introducing the active battery material particles to a first half of a total volume of binder-solvent solution that is evaporated away before introducing a second half of the total volume of binder-solvent solution. However, those skilled in the art will recognize that the method of FIG. 1 may include any number of mixture and evaporation steps without departing from the scope of this disclosure. It should further be recognized that the method of FIG. 1 may include differing volumes of binder-solvent solution spread amongst any number of mixture and evaporation steps without departing from the scope of this disclosure. For example, in another embodiment, the multi-step evaporation is a three-step evaporation in which a first step includes mixing and evaporating of active battery material particles with 50% of a total volume of binder-solvent solution, a second step includes mixing and evaporating of the resulting mixture with 25% of the total volume of binder-solvent solution, and a third step includes mixing and evaporating of the resulting mixture from the second step with 25% of the total volume of binder-solvent solution.

In another embodiment, the multi-step evaporation is a continuous evaporation process in which a small portion of a total volume of binder-solvent solution is mixed with and evaporated away at approximately the same time from the active battery material particles. Control of the solvent evaporation rate is achievable by evaporating solvent from the mixture at a rate that is approximately matched to the desired rate of introducing binder-solvent solution to the mixture. This evaporation is performable using techniques known in the art. Evaporation can be performed under atmospheric or reduced pressure conditions, and at ambient temperatures, or higher temperatures that do not degrade the constituent particles. As will be appreciated, the pressure and/or temperature selected depends on the solvent, polymers, and/or other constituent materials present within the powder mixture and binder solution, as well as the relative amounts of these materials. Accordingly, a chart of the binder particulate percentage by weight over time of the resulting mixture of binder-coated active battery material agglomerations looks more like a sloping line or curved line (e.g., depending on whether rates of introducing and evaporating of binder solution are varied over time) with continuous evaporation instead of a stair-step shape associated with the batched, multi-step evaporation processes previously discussed.

In some embodiments, a conductive particle mixture is dispersed within the binder-solvent solution (including with or without the use of dispersants) prior to agitating the first volume of the binder-solvent solution and the second volume of the binder-solvent solution with the particulate mixture. In other embodiments, the conductive particle mixture is dispersed within a second solvent solution (including with or without the use of dispersants) to generate a conductive dispersion having a dispersion limit for the conductive particle mixture within the second solvent solution at the first set of environmental parameters.

That conductive dispersion is introduced to and evaporated away from the active battery material particles by agitating, while retaining the first intermediate mixture within the vessel, a first volume of the conductive dispersion with the first intermediate mixture and subjecting, while retaining the first intermediate mixture within the vessel, the first intermediate mixture to the second set of environmental parameters. In one embodiment, this includes agitating, within the vessel and prior to agitating the first volume of the binder-solvent solution and the second volume of the binder-solvent solution with the particulate mixture, a first volume of the conductive dispersion with the particulate mixture to generate a fourth intermediate mixture. While retaining the fourth intermediate mixture within the vessel, the fourth intermediate mixture is subjected to the second set of environmental parameters to evaporate away the solvent.

In another embodiment, this includes agitating, subsequent to agitating at least the first volume of the binder-solvent solution, a first volume of the conductive dispersion with the third intermediate mixture to generate a fifth intermediate mixture. While retaining the fifth intermediate mixture within the vessel, the fifth intermediate mixture is subjected to the second set of environmental parameters to evaporate away the solvent. In yet another embodiment, the first volume of the binder-solvent solution and a first volume of the conductive dispersion are agitated, within the vessel and at substantially a same time, with the particulate mixture to generate the first intermediate mixture. While retaining the first intermediate mixture within the vessel, the first intermediate mixture is subjected to the second set of environmental parameters to evaporate away the solvent.

In another embodiment, agitating the first volume includes spraying, misting, fogging, atomizing, or pumping the first volume of the binder-solvent solution into the vessel and over the particulate mixture. Instead of the binder-solvent solution we can use a conductive solvent solution or we can we use a conductive-binder-solvent solution. In some embodiments the spraying, misting, fogging, atomizing, or pumping is done by using a purely hydraulic single fluid system. In other embodiments a two-fluid nozzle design can be employed to achieve the agitation, where one of the fluids is a compressed gas, or a compressed inert gas such as argon, nitrogen, etc.

In some embodiments, the binder-coated conductor-speckled active battery material agglomerates are further compacted or compressed to achieve denser agglomerates. These additional compaction or the compression steps maybe a discrete process or maybe a continuous process. Additional milling or particle size refinement steps helps achieve higher density agglomerates in some embodiments. In yet another embodiment, hot isostatic pressing (HIP) or cold isostatic pressing (CIP) helps achieve the same result of denser agglomerates. Mechanical mixing with or without the use of certain compaction aid or flow promotors can help achieve denser agglomerates.

Thus, various embodiments disclosed herein provide a dry powder-based manufacturing method for creating a binder-coated conductor-speckled active battery material. This method significantly reduces the amount of solvent needed for binder distribution and coating around active battery material particles. This is achieved by eliminating the need for excess solvents to maintain viscosities associated with the spreading of conventional solvent slurries on current collector foils. In other words, the dry-electrode manufacturing process decouples solvent usage for binder distribution from the requirement of sticking to current collector foils. The application of temperature and/or pressure changes during the production of the binder-coated active battery material agglomerations enables the use of solvents that previously could not be used in electrode fabrication, such as ethanol, methanol, and environmentally friendly solvents like supercritical $CO_2$. Additionally, the manufacturing of electrodes using the disclosed dry powder mixtures results in more cost-effective processes. This is due to the removal of the need for slurries to be stable over long periods of time and the usage of equipment to pump slurries across multiple systems for coating and drying. In essence, this method provides a more efficient, environmentally friendly, and cost-effective approach to the manufacturing of binder-coated conductor-speckled active battery material for use in various applications, including but not limited to, lithium-ion batteries.

In this manner, the disclosures herein substantially address the limitations of conventional electrode formation by introducing a dry powder-based manufacturing process for binder-coated conductor-speckled active battery material. This process significantly reduces the amount of solvent required, along with the associated heating and drying times inherent in the electrode manufacturing process. Electrodes manufactured with dry particles, such as the binder-coated conductor-speckled active battery material particulate subunits described in this disclosure, when coated on current collectors, represent a significant improvement in the manufacturing process. This method not only enhances the efficiency of electrode production but also contributes to the overall performance and longevity of the resulting battery components.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of producing binder-coated active battery material agglomerations, comprising:
    agitating, within a vessel, a first volume of a binder-solvent solution with a particulate mixture including active battery material particles to generate a first intermediate mixture, wherein the binder-solvent solution has a solubility limit for a mixture of binder material particles within a first solvent solution at a first set of environmental parameters;
    subjecting, while retaining the first intermediate mixture within the vessel, the first intermediate mixture to a second set of environmental parameters which reduces the solubility limit and generates a second intermediate mixture;
    agitating, while retaining the second intermediate mixture within the vessel, a second volume of the binder-solvent solution with the second intermediate mixture to generate a third intermediate mixture; and
    subjecting, while retaining the third intermediate mixture within the vessel, the third intermediate mixture to the second set of environmental parameters to generate a powder mixture of binder-coated active battery material agglomerations, wherein each of the binder-coated active battery material agglomerations includes one or more active battery material particles having at least a partial coating of binder material.

2. The method of claim 1, further comprising:
    dispersing a conductive particle mixture within the binder-solvent solution prior to agitating the first volume of the binder-solvent solution and the second volume of the binder-solvent solution with the particulate mixture.

3. The method of claim 1, further comprising:
    dispersing a conductive particle mixture within a second solvent solution to generate a conductive dispersion, wherein the conductive dispersion has a dispersion limit for the conductive particle mixture within the second solvent solution at the first set of environmental parameters.

4. The method of claim 3, further comprising:
agitating, while retaining the first intermediate mixture within the vessel, a first volume of the conductive dispersion with the first intermediate mixture; and
subjecting, while retaining the first intermediate mixture within the vessel, the first intermediate mixture to the second set of environmental parameters.

5. The method of claim 3, further comprising:
agitating, within the vessel and prior to agitating the first volume of the binder-solvent solution and the second volume of the binder-solvent solution with the particulate mixture, a first volume of the conductive dispersion with the particulate mixture to generate a fourth intermediate mixture; and
subjecting, while retaining the fourth intermediate mixture within the vessel, the fourth intermediate mixture to the second set of environmental parameters.

6. The method of claim 3, further comprising:
agitating, subsequent to agitating at least the first volume of the binder-solvent solution, a first volume of the conductive dispersion with the third intermediate mixture to generate a fifth intermediate mixture; and
subjecting, while retaining the fifth intermediate mixture within the vessel, the fifth intermediate mixture to the second set of environmental parameters.

7. The method of claim 3, further comprising:
agitating, within the vessel and at substantially a same time, the first volume of the binder-solvent solution and a first volume of the conductive dispersion with the particulate mixture to generate the first intermediate mixture; and
subjecting, while retaining the first intermediate mixture within the vessel, the first intermediate mixture to the second set of environmental parameters.

8. The method of claim 1, wherein a rate of solvent introduction to the vessel is substantially similar to a rate of solvent evaporation from the vessel.

9. The method of claim 1, wherein agitating the first volume includes spraying, misting, fogging, atomizing, or pumping the first volume of the binder-solvent solution into the vessel and over the particulate mixture.

10. The method of claim 1, wherein the particulate mixture includes one or more conductor-speckled active battery material particles held together by electrostatic forces, and further wherein each of the conductor-speckled active battery material particles includes a plurality of conductive particles in electrical contact with an active battery material particle.

11. The method of claim 1, wherein the mixture of binder material particles comprise 1-20% by weight of the binder-solvent solution.

12. The method of claim 1, wherein the first set of environmental parameters includes at least one of applied heat or pressure above ambient conditions, and further wherein the second set of environmental parameters includes a reduction in at least one of pressure or temperature.

13. The method of claim 1, further comprising: mechanically agitating the first intermediate mixture during the steps of subjecting the first intermediate mixture to the second set of environmental parameters.

14. The method of claim 1, wherein the binder material particles are selected from the group consisting of polyvinylidene fluoride (PVDF), poly(vinylidene fluoride-co-hexafluoropropylene) (PVDF-HFP), polytetrafluoroethylene (PTFE), polyimides, ethylene-propylene-diene monomer (EPDM), poly(acrylic acid-co-maleic acid) (PAA-MA), poly(acrylic acid-co-itaconic acid) (PAA-IA), partially or fully fluorinated polymers and copolymers, poly(acrylic acid) (PAA), lithiated poly(acrylic acid) (lithiated-PAA), carboxymethyl cellulose (CMC), sodium carboxymethyl cellulose (NaCMC), and, styrene butadiene rubber (SBR).

15. The method of claim 1, wherein the active battery material particles are selected from the group consisting of lithium iron phosphate (LFP), lithium nickel manganese cobalt oxide (NMC), lithium cobalt oxide (LCO), lithium manganese oxide (LMO), lithium titanate (LTO), lithium nickel cobalt aluminum (NCA) oxide, synthetic graphite particulate, natural graphite particulate, silicon nanocomposites, silicon graphite composite, silicon porous carbon composite, $LiTiO_2$, $Li_4Ti_5O_{12}$, tin particulate, and SiOx/silicon particulate.

16. The method of claim 1, wherein the first solvent solution and the second solvent solution are selected from the group consisting of dimethylformamide (DMF), dimethyl sulfoxide (DMSO), N-methylpyrrolidone (NMP), dimethylacetamide (DMAc), triethyl phosphate (TEP), dihydrolegoflucosenone (cyrene), acetyl tributyl citrate (ATBC), acetone, tetrahydrofuran (THF), difluoromethane ($CH_2F_2$), ethanol, methanol, water, and carbon dioxide.

* * * * *